UNITED STATES PATENT OFFICE.

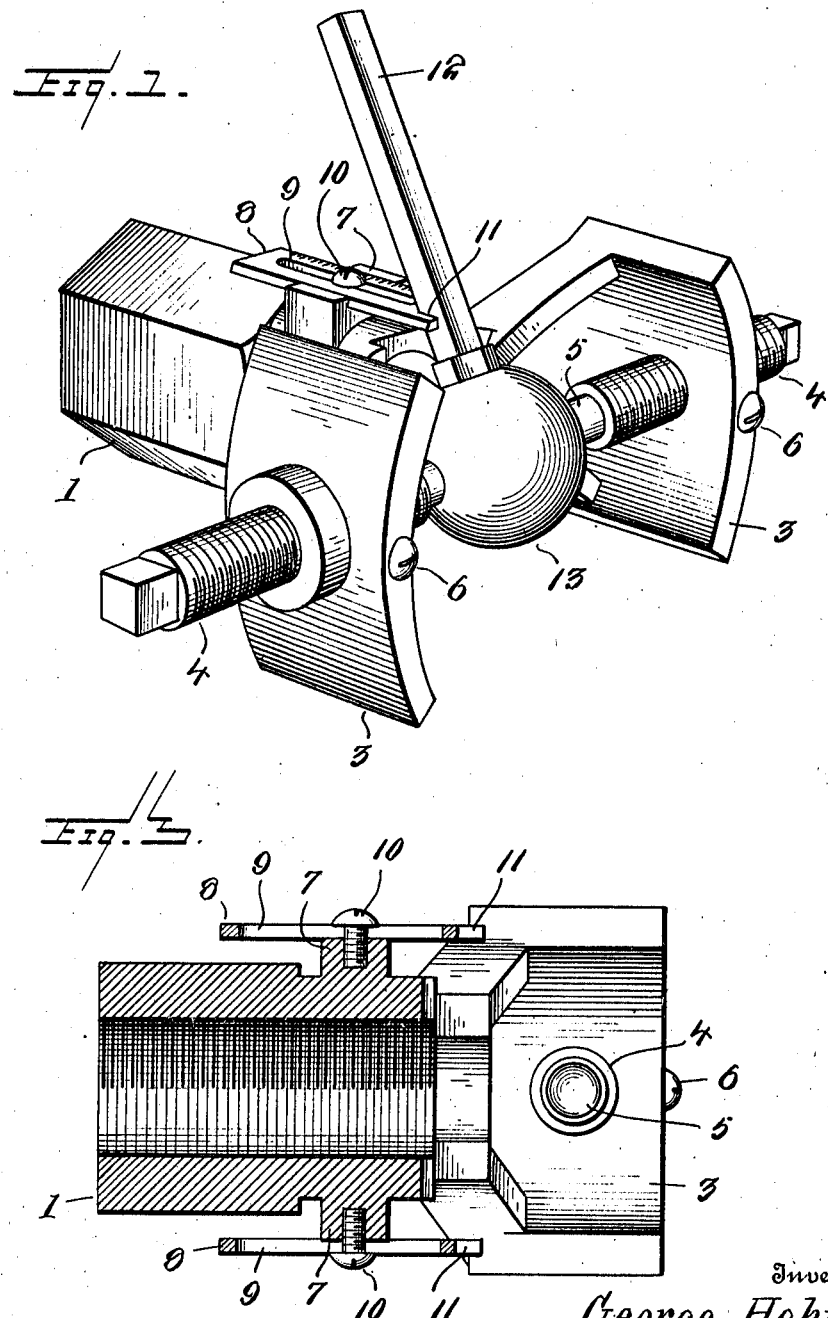

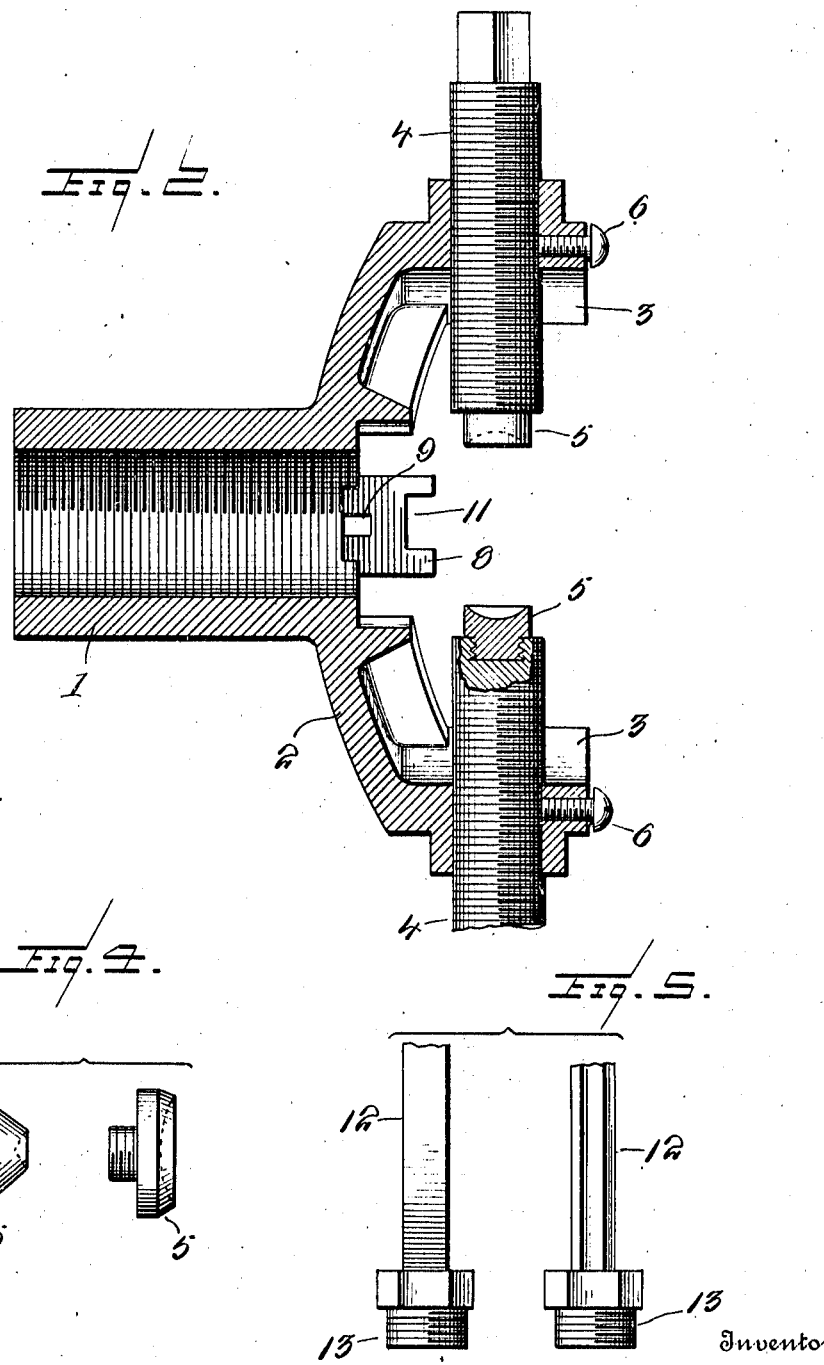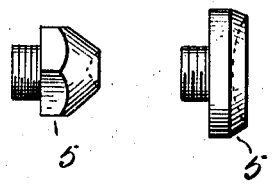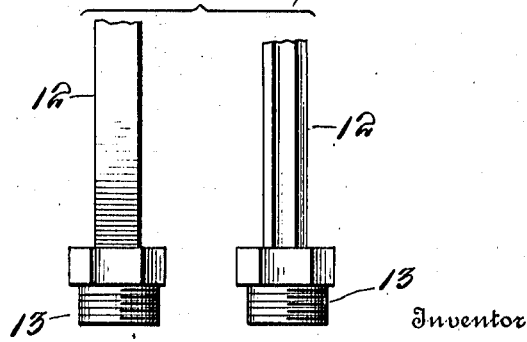

GEORGE HAHN, OF NEW YORK, N. Y.

WORK-HOLDER.

982,668.  Specification of Letters Patent.  Patented Jan. 24, 1911.

Application filed June 4, 1910. Serial No. 564,984.

*To all whom it may concern:*

Be it known that I, GEORGE HAHN, a citizen of the United States, residing at New York, in the county of New York and State of New York, have invented new and useful Improvements in Work-Holders, of which the following is a specification.

The present invention appertains to work holders and has for its object to provide a chuck for holding fittings of various kinds while boring openings therein at different angles, the purpose being to provide a work holder which will admit of the openings being accurately bored at the required angle or regularly spaced in the event of several openings being required at regular intervals.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a perspective view of a work holder or chuck as it will appear when securing a piece of work to be bored. Fig. 2 is a horizontal section of the chuck, the work being removed. Fig. 3 is a vertical central section. Fig. 4 is a view showing different styles of centers. Fig. 5 is a view showing different forms of gages.

Corresponding and like parts are referred to in the following description, and indicated in all the views of the drawings, by the same reference characters. The chuck or body thereof comprises a stem 1 and a head 2, the latter being provided at its ends with wings 3, which by preference curve. The stem 1 is formed with an opening which is internally threaded to admit of securing the chuck to a tool, post or other support. The wings 3 are provided with threaded openings, the latter being reinforced so as to provide extended bearings for spindles 4, which are located in line and are provided at their inner ends with removable centers or work gripping jaws 5. The centers or jaws 5 may be of varying form, as indicated in the several views and more particularly in Fig. 4, thereby adapting the chuck for a variety of work. The centers or work gripping jaws 5 may be fitted to the spindles 4 in any manner, but it is preferred to have the inner ends of the spindles formed with threaded openings to receive the threaded stems of the parts 5. By having the spindles 4 threaded into the wings 3 the spindles may be adjusted to admit of different sizes of work being gripped between them. Set screws 6 threaded into openings formed in the wings 3 are adapted to have their inner ends engage the spindles 4 so as to secure the latter in the adjusted position. The spindles 4 may be turned by any means fitted to the outer ends thereof. As shown the heads of the spindles are made angular to receive a suitable wrench or spanner.

Lugs 7 are provided at opposite points upon the body of the chuck and form supports for gages 8. The lugs 7 are located upon opposite sides of the stem 1 opposite the spaces formed between the wings 3, and recesses are formed in their outer sides to receive the gages 8, the side walls of the recesses being undercut and the outer edges of the gages correspondingly beveled so as to retain the gages in place. While it is preferred to provide two gages it is to be understood that one of the gages may be dispensed with. The gages 8 consist of plates in which longitudinal slots 9 are formed to receive set screws 10, which are threaded into the lug 7 and are adapted to secure the gages in the adjusted position. The gages are provided with scale indications to admit of positioning the gages with accuracy. The outer or forward ends of the gages have recesses 11 which may be differently formed according to the cross sectional outline of the coöperating gage 12, which latter is applied to the work 13. The gage 12 consists of a bar having a threaded end 14, which is adapted to enter the threaded opening formed in the work 13. The gage 12 may be of square form in cross section or of any outline according to the number of openings to be drilled into the work so that by turning the work after the gage has been applied thereto openings may be drilled into the work at points corresponding with the sides of the gage or bar 12. In the event of the gage bar 12 being of square form two or four openings may be drilled in the sides of the work at equal distances. In the event of the gage bar being hexagonal in cross section three or six openings may be drilled in the sides of the work at regular intervals apart. By providing a number of different forms of gage bars 12 any number of openings may be drilled in the sides of the work at uniform distances. By moving the gages 8 forward or rearward the inclination of the openings drilled into the work may be regulated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A work holder comprising a head, oppositely disposed work gripping members adjustably mounted upon the head and provided with work centering jaws to admit of securing the work in a variety of positions, and a gage adjustably mounted upon said head and arranged opposite the space formed between the work gripping members to fix the predetermined position of the work.

2. A work holder comprising a head, oppositely disposed work gripping members adjustably mounted upon the head, means for securing said work gripping members in the adjusted position, a gage adjustably mounted upon said head to properly position the work, and a second gage adapted to be secured to the work and designed to coöperate with the gage applied to the said head.

3. A work holder comprising a head, oppositely disposed work gripping members mounted upon said head, and a gage adapted to be secured to the work for properly positioning the work according to the desired result to be effected.

4. A work holder comprising a head, oppositely disposed work gripping members mounted upon the head, and a gage adjustable upon said head and located opposite the space formed between the inner ends of the work gripping members and adjustable toward and from the work gripping members to admit of varying the relative inclination of the work.

5. A work holder comprising a head having spaced wings projecting therefrom, spindles threaded into said wings and adapted to aline, work gripping jaws movably fitted to the inner ends of the spindles, and a gage mounted upon said head and adjustable toward and from said spindles to vary the relative inclination of the work.

6. A work holder comprising a body, oppositely disposed work gripping members mounted upon the body, a gage adjustable upon the body and having a recess in its outer end, and a gage bar to be fitted to the work and adapted to fit the recess of the gage mounted upon the head to properly position the work.

7. The herein described work holder comprising a stem having a threaded opening, a head at one end of the stem, wings at the ends of the head provided with threaded openings, spindles mounted in said threaded openings, work gripping centers detachably fitted to the inner ends of the spindles, set screws for securing the spindles in the adjusted position, gages adjustably mounted upon the stem opposite the spaces formed between the wings, and a gage bar to be fitted to the work and adapted to coöperate with either one of the aforesaid gages.

In testimony whereof I affix my signature in presence of two witnesses.

GEORGE HAHN.

Witnesses:
PATRICK POWERS,
DAVID MACINTYRE.